METHOD OF MANUFACTURING APPARATUS HANDLING MEANS

Original Filed May 17, 1954 2 Sheets-Sheet 1

INVENTOR.
Larry J. Budd

BY

Hill, Sherman, Meroni, Gross & Simpson ATTORNEYS

March 12, 1963 L. J. BUDD 3,080,690

METHOD OF MANUFACTURING APPARATUS HANDLING MEANS

Original Filed May 17, 1954 2 Sheets-Sheet 2

INVENTOR.
Larry J. Budd

BY

Hill, Sherman, Meroni, Gross & Simpson

ATTORNEYS

United States Patent Office 3,080,690

Patented Mar. 12, 1963

3,080,690

METHOD OF MANUFACTURING APPARATUS HANDLING MEANS

Larry J. Budd, Des Plaines, Ill., assignor to Pallet Devices, Inc., Des Plaines, Ill., a corporation of Illinois Original applications May 17, 1954, Ser. No. 430,382 and Mar. 9, 1959, Ser. No. 797,936, now Patent No. 2,888,222, dated May 26, 1959. Divided and this application Mar. 9, 1961, Ser. No. 94,526

12 Claims. (Cl. 53—196)

This invention relates to apparatus handling methods and more particularly to methods by which apparatus may be readily and safely handled, assembled and protected for transport.

The present application is a division of my U.S. patent entitled "Apparatus Handling Means," filed May 17, 1954, No. 2,888,222 and of my co-pending U.S. patent application entitled "Apparatus Handling Methods" filed March 9, 1959, Serial No. 797,936.

In an exemplary application of this invention, a television receiver cabinet, after manufacture thereof is completed and preferably before transportation thereof, has installed on the underside of the bottom wall thereof an expendable palletized support structure. The cabinet is then transported to an assembly point which is, of course, readily accomplished by virtue of the palletized support of the cabinet. At the assembly point, the television receiver chassis and associated apparatus are installed in the cabinet. The cabinet may then be readily transported to final checking points, if desired, and thence to a second assembly point. At this point, the cabinet together with the receiver therewithin and the palletized support structure secured thereto is installed in a suitable container for shipment. When the container arrives at the place of business of the dealer or distributor, the cabinet together with the receiver and palletized support structure may be removed from the container and the palletized support structure again improves handling of the assembly and need not be removed until the receiver reaches its ultimate destination.

It will be readily appreciated by those skilled in the art that installation of the palletized support structure on the cabinet prior to transportation of the cabinet to the point where the receiver apparatus is installed therewithin will greatly facilitate handling of the cabinet. It will also be appreciated that the palletized support structure will also greatly facilitate handling of the receiver from the point where the receiver apparatus is installed therewithin to the point where the cabinet together with the receiver is installed in a container. It will be further appreciated that the palletized structure provides added protection for the receiver and cabinet while being transported within the container and, of course, it also facilitates handling of the receiver and cabinet by the dealer or distributor.

A specific feature of the invention relates to the manner of securing the palletized support structure to the underside of the cabinet bottom. According to this feature, the cabinet may be of a type having bumpers secured by headed fastening means, such as screws, to the underside of the bottom thereof, such bumpers being ordinarily formed of a rubber or similar resilient or elastomeric material. Holes may be cut in the palletized support structure in the same spacing and relation as the bumpers and, after the support structure is disposed against the underside of the cabinet bottom, the bumpers may be disposed against the underside of the palletized support structure in alignment with the holes therein after which the headed fastening means may be extended through the bumpers and through the holes to secure both the bumpers and through the holes to secure both the bumpers and the palletized support structure against the bottom of the cabinet. The fastening means thus performs a dual function and separate means for securing the palletized support structure to the cabinet bottom are not required.

In accordance with another specific feature of the invention, the receiver may be secured on the bottom of the cabinet by fastening means such as screws extending upwardly through holes in the cabinet bottom and before installation of the palletized support base on the cabinet bottom, holes may be cut in the base in the same spacing and relation as such fastening means so that after the palletized support structure or base is installed on the cabinet bottom and after the cabinet is transported to the assembly point, the receiver may be readily installed in the cabinet without necessitating removal of the palletized support structure.

An important feature of the invention resides in the construction of the palletized support structure. According to this feature, the palletized support structure may be formed by folding under opposite edge portions of a sheet of relatively rigid form-sustaining material to form tube-like supports along such edges. After the structure is installed on the cabinet bottom, the cabinet may then be readily and safely handled by engaging under the portion of the structure intermediate the tube-like supports. The tube-like supports also perform an important function when the cabinet is installed in a container for shipment since the tube-like supports may then transmit the weight of the cabinet and receiver to portions of the bottom of the container adjacent the sides thereof, such portions of the bottom being most securely supported from the container side walls.

The tube-like supports may preferably be formed by scoring the sheet of relatively rigid form-sustaining material along score lines including a first score line spaced a first predetermined distance from one end of the sheet to define a first section, a second score line spaced a second predetermined distance from the first score line to define a second section, a third score line spaced from the second score line a distance slightly greater than said first predetermined distance to define a third section and a fourth score line spaced from the third score line a distance slightly greater than said second predetermined distance to define a fourth section. The sheet may then be bent at the score lines to dispose the first section against the portion of the sheet adjacent the fourth score line with the third section parallel to the first section and with the second and fourth sections normal to the first and third sections. Preferably, the first section may be adhesively secured to the portion of the sheet against which it is engaged.

It has been found that by this method, the tubular support means may be readily provided. Further, the support means so formed are superior to any other known manner of construction of the same, for the purposes of the instant invention.

According to a still further specific feature of the invention, plugs may be so disposed in the tube-like supports in positions transverse to the direction thereof so as to greatly strengthen and rigidify the same. The plugs may also serve as a means for transmitting the weight of the cabinet directly to a support surface.

Further, in accordance with another specific feature of the invention, the plugs may have an inverted cup-like configuration and may have a tube-like portion to receive one of the bumpers previously referred to and an upper wall apertured for passage of fastening means therethrough, the fastening means as previously indicated being arranged to secure both the bumpers and the palletized support structure to the underside of the cabinet.

Most preferably, the inverted cup-shaped plugs may have lower outwardly projecting annular rims for limiting upward movement thereof and for obtaining a broader area for engagement with the supporting surface.

An object of this invention, accordingly, is to provide improved apparatus handling methods.

Another object of this invention is to provide an improved method of handling assemblies wherein apparatus is installed within the housing in which a palletized support structure is secured to the housing prior to transportation of the housing to a point where the apparatus is installed therein.

Still another object of this invention is to provide an improved method of construction of palletized support structure.

This invention contemplates other objects, features and advantages which will become more fully apparent from the following detailed description taken in conjunction with the accompanying drawings which illustrate a preferred embodiment and in which.

Figures 1, 2:
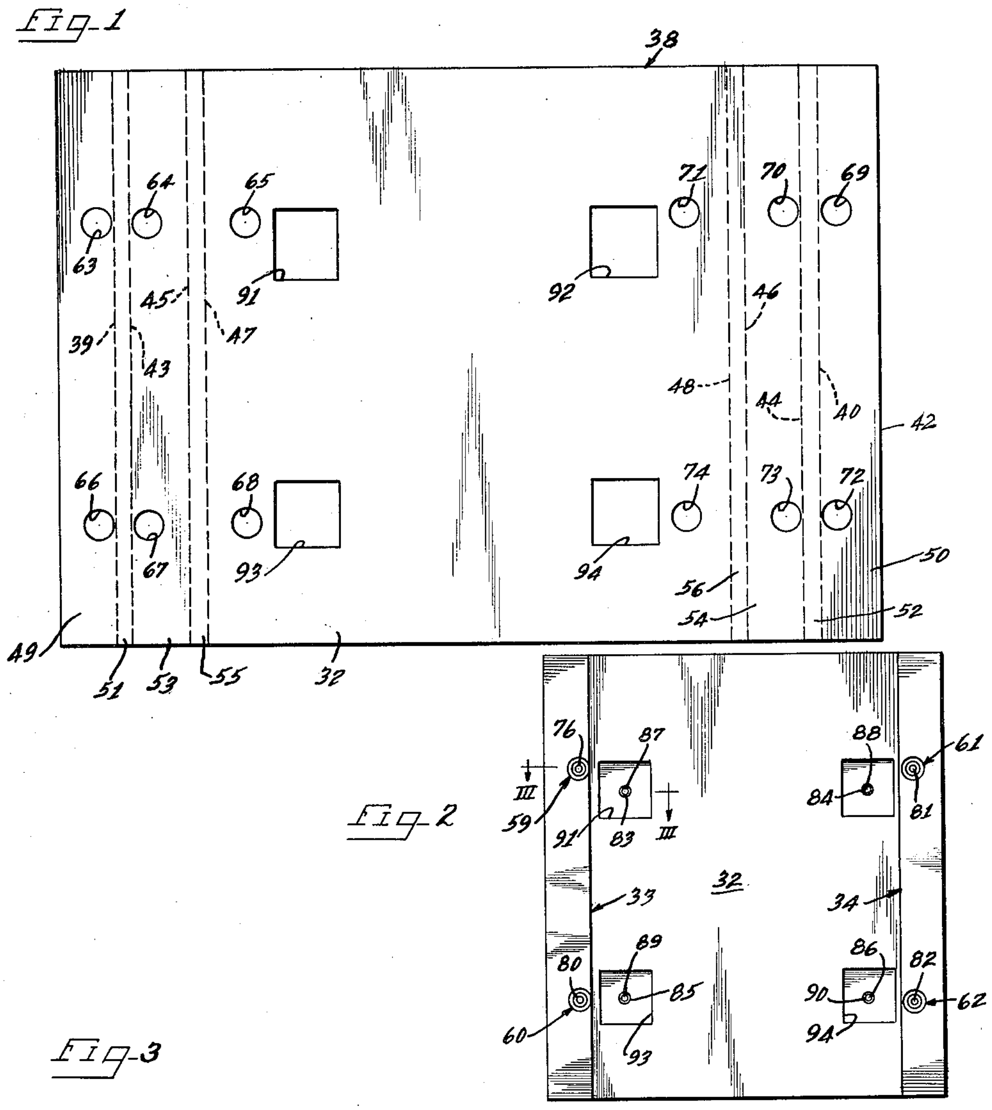
FIGURE 1 is a view illustrating a blank from which a support structure or pallet may be formed, in accordance with the principles of this invention.
FIGURE 2 is a sectional view taken substantially along lines II—II of FIGURE 4 and illustrating a bottom plan view of the support structure for the television receiver.

Reference numeral 10 generally designates a shipping container which may house a television receiver 11. The container 10 may comprise a front wall 12, a rear wall 13, side walls 14 and 15, a top defined by a first pair of flaps 16 and 17 extending inwardly from the top edges of the side walls 14 and 15, respectively and a second pair of flaps 18 and 19 extending inwardly over the flaps 16 and 17 from the top edges of the front wall 12 and the rear wall 13, respectively, and a bottom defined by flaps 20 and 21 extending inwardly from the lower edges of the side walls 14 and 15, respectively and flaps 22 extending inwardly from the lower edges of the front and rear walls 12 and 13 under the flaps 20 and 21.

The television receiver 11 may comprise a cabinet generally designated by reference numeral 23 which may comprise a front wall 24, a top wall 25, a bottom wall 26, side walls 27 and 28 and a removable rear wall 29. Receiver apparatus is installed within the cabinet 23 which may include a chassis 30 disposed on the upper surface of the cabinet bottom wall 26.

The receiver 11 may be supported within the container 10 by means including a palletized structure generally designated by reference numeral 31 which may comprise a section 32 underlying the cabinet bottom wall 26 and generally tubular support structures or pads 33 and 34 underlying and supporting opposite edge portions of the section 32. As will be apparent from the foregoing preliminary discussion, the palletized support structure 31 and the manner of utilizing the same is the gist of the present invention.

Before proceeding with a detailed description of the palletized support structure 31 and the manner of constructing and utilizing the same, it may be noted that a top support structure 35 may be disposed over the top wall of the cabinet 23 and may have generally tubular spacer means 36 and 37 depending from the opposite side edges thereof to engage between the side walls 27 and 28 of the cabinet 23 and the side walls 14 and 15 of the container 10. The structure 35 and the manner of constructing the same forms an important feature of my copending patent entitled "Means for Supporting Apparatus for Shipment," filed May 17, 1954, U.S. Patent No. 2,895,661.

It is believed that the manner of construction and utilization of the palletized support structure 31 will be best understood from a step-by-step description of the construction and utilization thereof. Reference is therefore made to FIGURE 1 which illustrates a blank 38 from which the support structure 31 is formed.

The blank 38 may, as shown, be of generally rectangular shape and may be of any relatively rigid form-sustaining sheet material and preferably of an inexpensive expendable material such as paperboard, fiberboard or the like.

To form the tube-like supports 33 and 34, opposite edge portions of the blank 38 may be folded under by making ends at score lines which may be scored by marking the blank or preferably by actual indentation of the blank, especially when the blank is of paperboard or a like material, but it will be appreciated that marking or indentation is not necessarily required and the terms "scoring" and "score line" are therefore used in a figurative sense to indicate the position of the bends.

In particular, score lines 39 and 40 may be located parallel to and at first predetermined distances from opposite edges 41 and 42 of the blank 38, score lines 43 and 44 may be located parallel to and at second predetermined distances inwardly from the score lines 39 and 40, score lines 45 and 46 may be located parallel to and spaced inwardly from the score lines 43 and 44 at distances slightly greater (by about the thickness of the sheet material) than the aforesaid first predetermined distances, and score lines 47 and 48 may be located parallel to and spaced inwardly from the score lines 45 and 46 by distances slightly greater (by about the thickness of the sheet material) than the aforesaid second predetermined distances.

The score lines 39 and 40 together with the edges 41 and 42 of the blank 38 may be considered as forming first sections 49 and 50, the score lines 39 and 40 together with the score lines 43 and 44 may be considered as forming second sections 51 and 52, the score lines 43 and 44 together with the score lines 45 and 46 may be considered as defining third sections 53 and 54, the score lines 45 and 46 together with the score lines 47 and 48 may be considered as defining fourth sections 55 and 56, and the score lines 47 and 48 may be considered as defining the section 32 which, as pointed out above, engages the underside of the cabinet bottom wall 26.

Figure 4:
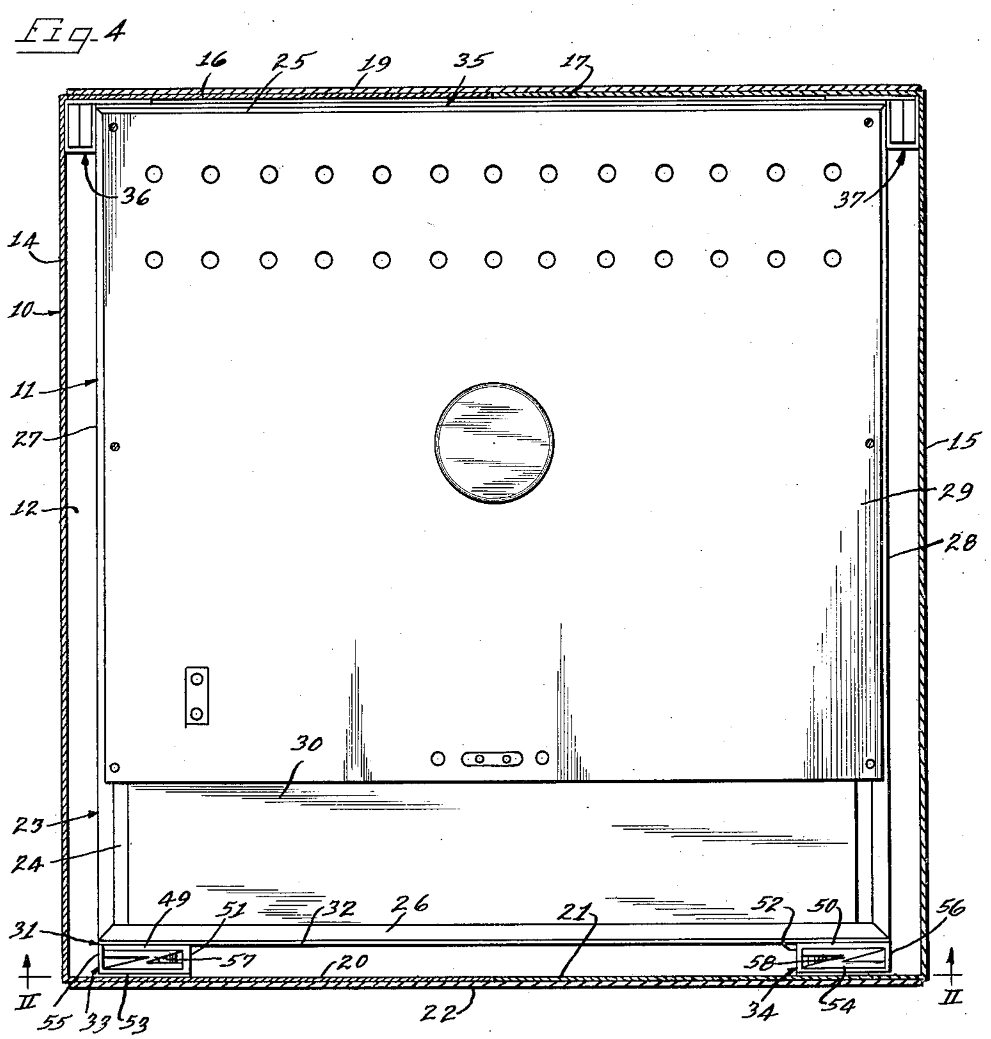
FIGURE 4 is a sectional view taken substantially along lines IV—IV of FIGURE 5 and showing the television receiver and support structure therefor in rear elevation.
Figure 5:
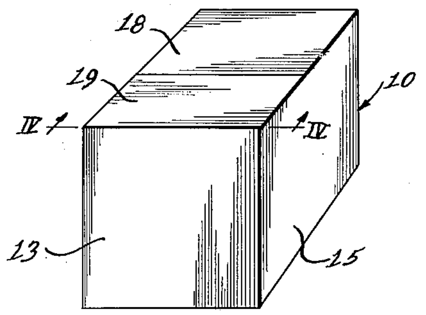
FIGURE 5 is a perspective view of a container having a television receiver packed therewithin for shipment, in accordance with the principles of this invention.

The blank may be bent at the score lines 39, 40 and 43–48 so that the fourth sections 55 and 56 extend downwardly at right angles to the section 32 with the third sections 53 and 54 extending inwardly in parallel relation to the section 32 and with the second sections 51 and 52 extending upwardly to the underside of the section 32 in parallel relation to the fourth sections 55 and 56, as shown in FIGURE 4.

The first sections 49 and 50 may extend inwardly from the upper edges of the sections 51 and 52 (at score lines 39 and 40) but much greater rigidity is obtained by extending the sections 49 and 50 outwardly toward the sections 55 and 56. Most preferably, the terminal edges of the first sections 49 and 50, that is, edges 41 and 42 of the blank 38, are in firm engagement with the sections 55 and 56 and the section 32. With this arrangement, maximum strength and rigidity is obtained and yet the supports 33 and 34 are readily formed.

The sections 49–56 may be secured in the positions as illustrated in FIGURE 4 by securing the first sections 49 and 50 to the section 32, preferably by adhesive engagement between the upper surfaces of the sections 49 and 50 and the lower surface portions of the section 32 in facing relation thereto. This may be accomplished by applying glue to the surfaces of the sections 49 and 50 and/or such facing surface portions of the section 32 before the sections are in the positions as illustrated in FIGURE 4.

After the sections 49–56 are in the positions as illustrated in FIGURE 4, brace members 57 and 58 may be inserted in the tube-like supports defined thereby. Such brace members may be of sheet material such as paper-board bent into a Z-like configuration with the intermediate diagonal portion of brace member 57 extending between the junction between sections 53 and 55 (at score line 45) and the junction between sections 49 and 51 (at score line 39) and with the intermediate diagonal portion of member 58 extending between the junction between sections 54 and 56 (at score line 46) and the junction between sections 50 and 52 (at score line 40). It has been found that with this specific arrangement, maximum strength and rigidity of the supports 33 and 34 is achieved.

A feature of the invention resides in the provision of one or more plugs in each of the depending support means for rigidifying the same. According to this feature, a pair of plugs 59 and 60 are disposed in the tube-like support structure 33 and a pair of plugs 61 and 62 are disposed in the tube-like support structure 34. To receive the plugs 59–62, openings may be cut in the supports 33 and 34 and the section 32 after the supports 33 and 34 are formed. Preferably, however, suitable holes are cut in the blank 38 prior to formation of the supports 33 and 34.

In particular, a hole 63 is cut in the section 49, a hole 64 is cut in the section 53 and a hole 65 is cut in the section 32, the holes 63, 64 and 65 being aligned when the sections 49, 51, 53 and 55 are bent to form the support 33. The plug 59 may then be inserted therethrough to rigidify the support 33.

Similarly, holes 66, 67 and 68 are cut in the sections 49, 53 and 32, respectively, to receive the plug 60, holes 69, 70 and 71 are cut in the sections 50, 54 and 32, respectively, to receive the plug 61, and holes 72, 73 and 74 are cut in the sections 50, 54 and 32 to receive the plug 62.

As discussed heretofore, a further feature of the invention is in the use of bumpers together with fastening means used to secure such bumpers through the underside of the cabinet to secure the palletized support structure 31 to the bottom wall 26 of the cabinet.

Figure 3:
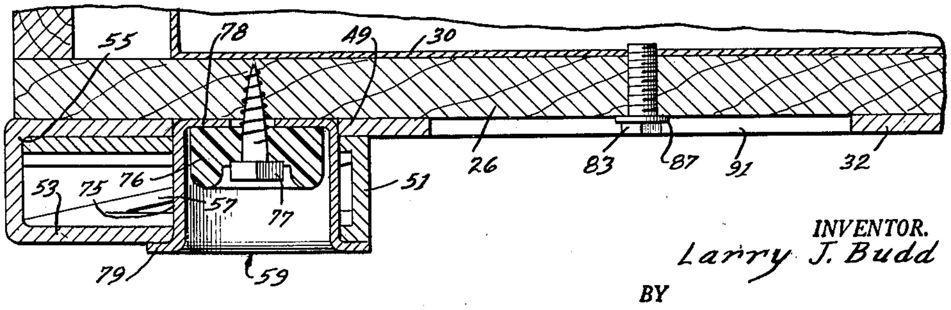
FIGURE 3 is a sectional view taken substantially along lines III—III of FIGURE 2.

In accordance with this feature, the plugs 59–62 may be so formed as to receive such bumpers. In particular, as illustrated in FIGURE 3, the plug 59 may have an inverted cup-like configuration with a tube-like portion 75 arranged to receive a bumper 76 which, as is conventional, may be of a resilient or elastomeric material such as rubber or plastic. Such bumpers are, of course, provided to prevent marring of the floor or table on which the cabinet is placed. To secure the bumper 76 to the bottom wall 26 of the cabinet 23, a headed fastening member such as a wood screw 77 may extend through a central opening in the bumper 76.

The screw 77 may also serve to fasten the palletized support base 31 to the cabinet 23 and for this purpose, the plug 59 may have an upper wall 78 having an opening therein of sufficient diameter for passage of the shank of screw 77 therethrough, but small enough to prevent passage of the bumper 76 therethrough. The upper surface of the top wall 78 of the plug 59 may preferably be on the level with the upper surface of the section 32.

In accordance with a further specific feature of the invention, the plug 59 may have an integral outwardly projecting annular flange or rim portion 79 at its lower end arranged to engage the lower surface of the support 33 about the openings therein, that is, the surface of section 53 about the opening 64.

The plugs 60, 61 and 62 may preferably be of a form similar to the plug 59 to receive bumpers 80, 81 and 82, respectively.

According to a further feature of the invention, provision is made for securing the receiver chassis 30 on the bottom wall 26 of the cabinet 23 after the palletized support structure 31 is secured to the underside of the bottom wall 26. In particular, the receiver chassis 30 may be rigidly secured to the cabinet bottom wall 26 by headed fastening means such as screws 83, 84, 85 and 86, which screws extend upwardly through the bottom wall 26 and are threaded into the chassis 30, as is illustrated in connection with the screw 83 in FIGURE 3. If desired, and preferably, washers 87, 88, 89 and 90 may be disposed between the heads of the screws 83–86 and the bottom surface of the bottom wall 26 about the screw holes therein.

To permit ready attachment of the chassis 30 to the bottom wall 26 after the palletized support structure 31 is attached to the bottom wall 26, section 32 may be preformed with holes 91, 92, 93 and 94 having the same spacing and relation as the holes in the cabinet bottom wall 26 receiving the fastening means 83, 84, 85 and 86, respectively. The holes 91, 92, 93 and 94 may preferably be considerably larger than the heads of the fastening means 83–86 and washers 87–90, if used, and may be generally square as illustrated for most ready formation thereof. The holes 91–94 may, of course, be cut at the same time that the holes 63–74 are cut.

To summarize, the blank 38 may be scored with the score lines 39, 40 and 43–48 as illustrated in FIGURE 1 and at the same time, the circular holes 63–74 may be cut and also the square holes 91–94. The sections 49–56 may then be folded under the opposite sides of the section 32 to the positions illustrated in FIGURE 4 and the sections 49 and 50 may be adhesively secured to the facing underside portions of the section 32. Brace members 57 and 58 may thereafter be inserted in the tube-like supports 33 and 34. The plugs 59–62 may then be inserted in the aligned openings in the supports 33, 34 and section 32 and the brace members 57 and 58.

The palletized support structure 31 may then be disposed against the underside of the cabinet bottom wall 26 after which the bumpers 76, 80, 81 and 82 may be inserted in the plugs 59, 60, 61 and 62, respectively, and the fastening means 77 may then be used to secure the bumpers together with the palletized support structure 31 to the underside of the cabinet bottom 26.

The cabinet 23 may then be transported to an assembly point. This transportation may most readily be accomplished by inserting lifting and carrying means between the support structures 33 and 34.

When the cabinet reaches the assembly point, the receiver apparatus including the chassis 30 may be installed in the cabinet 23 and securely fastened therein by means of the fastening means 83–86. Thereafter, the back 29 may be secured on the cabinet 23 and if desired, final testing and checking operations may be performed on the receiver 11. The receiver 11, including the cabinet 23, the receiver apparatus and the palletized support structure 31 may then be transported to a second assembly point, again by inserting lifting and support means between the support structures 33 and 34, if desired.

When this second assembly point is reached, the cabinet 11 together with the receiver apparatus and palletized support structure 31 may be disposed within the container 10, the top structure 35 may be disposed over the top of the cabinet 23 and the flaps 16–19 of the container top may be closed.

It may be noted, at this point, that the tube-like supports 33 and 34 engage portions of the container bottom adjacent the side walls 14 and 15 to transmit the weight of the receiver 11 to such portions, which portions, of course, are most securely supported from the side walls 14 and 15.

After the container 10 with the receiver 11 therewithin reaches the dealer or distributor, the palletized support structure 31 may then be readily used in transporting the receiver 11 to its ultimate destination and need be removed only after such ultimate destination is reached. The palletized support structure 31 is, of course, very inexpensively constructed and can be thrown away.

It may be noted that the palletized support structure 31 may act in any position and terms such as "upper," "lower"

and the like are therefore used herein only for the purpose of conciseness and clarity of description and reference and are not to be construed as limitations.

It will be further understood that modifications and variations may be effected without departing from the spirit and scope of the novel concepts of the present invention.

I claim as my invention:

1. In a method of making a palletized support base, the steps of cutting four holes in a central portion of a sheet of relatively rigid form-sustaining fiber board material while contemporaneously scoring the sheet at its margin spaced outwardly of the holes in the central portion along score lines including a first score line spaced a first predetermined distance from one end of the sheet to define a first section, a second score line spaced a second predetermined distance from said first score line to define a second section, a third score line spaced from said second score line a distance slightly greater than said first predetermined distance to define a third section, and a fourth score line spaced from said third score line a distance slightly greater than said second predetermined distance to define a fourth section, then bending said sheet at said score lines to dispose said first section against the portion of the sheet adjacent said fourth score line with said third section parallel to said first section and with said second and fourth sections at generally right angles to said first and third sections and securing the thus folded margins of the sheet to the central portion of the sheet with said holes being spaced inwardly of the folded margins on the central portion.

2. In a method of making a palletized support base, the steps of scoring a sheet of relatively rigid form-sustaining fiber board material along score lines including a first score line spaced a first predetermined distance from one end of the sheet to define a first section, a second score line spaced a second predetermined distance from said first score line to define a second section, a third score line spaced from said second score line a distance slightly greater than said first predetermined distance to define a third section, and a fourth score line spaced from said third score line a distance slightly greater than said second predetermined distance to define a fourth section, then bending said sheet at said score lines to dispose said first section against the portion of the sheet adjacent said fourth score line with said third section parallel to said first section and with said second and fourth sections at generally right angles to said first and third sections forming tubular cushioning pads at opposite margins of the sheet, adhesively securing said first section against said portion of the sheet, reinforcing the pads by securing brace members internally of the pads, and extending fasteners though the pads as well as through the sheet for securing the base with an apparatus.

3. In a method of packaging an apparatus, the steps of folding the opposite edges of a fiberboard blank forming the blank into a pallet with cushioning pads on the underside while forming the edges and the pads with sockets extending vertically therethrough, disposing resilient bumpers within the sockets, and inserting fasteners within the sockets and extending them through the resilient bumpers and through the pallet for attachment with an apparatus.

4. In a method of packaging an apparatus, the steps of forming each of at least two ends of a sheet of relatively rigid form-sustaining material into cushioning pads to form a pallet, as follows: scoring the sheet along score lines including a first score line spaced a first predetermined distance from one end of the sheet to define a first section, a second score line spaced a second predetermined distance from said first score line to define a second section, a third score line spaced from said second score line a distance slightly greater than said first predetermined distance to define a third section, and a fourth score line spaced from said third score line a distance slightly greater than said second predetermined distance to define a fourth section, then bending said sheet at said score lines to dispose said first section against the portion of the sheet adjacent said fourth score line with said third section parallel to said first section and with said second and fourth sections at generally right angles to said first and third sections and securing said first section against said portion of the sheet whereby a pallet is formed having cushioning pads, the sections having aligned openings providing sockets on the pads, extending fasteners into the sockets through the cushioning pads the pallet for attachment to the apparatus.

5. The method of claim 4 further characterized by the palletized support base having a series of cushioning pads each formed from folded sections in the manner described above, forming sockets in the cushioning pads, and extending fasteners into the sockets for attachment to an apparatus.

6. In a method of manufacturing a pallet, the steps of scoring the margins of a fiberboard sheet to form a series of pad sections and punching the margins to form a series of holes in the margins, rolling up and folding the margins of the fiberboard sheet at the score lines forming cushioning pads at the underside of opposite margins of a pallet while contemporaneously aligning the holes to form sockets in the pads, and disposing fasteners within the sockets and etxending them through the pads of the pallet for attachment with an apparatus.

7. In a method of manufacturing a pallet, the steps of scoring the margins of a fiberboard sheet to form a series of pad sections and punching the margins to form a series of holes in the margins, rolling up and folding the margins of the fiberboard sheet at the score lines forming cushioning pads at the underside of opposite margins of a pallet while contemporaneously aligning the holes to form sockets in the pads, disposing resilient bumpers within the sockets, and inserting fasteners within the sockets and extending them through the resilient bumpers and through the pads of the pallet for attachment with an apparatus.

8. In a method of manufacturing a pallet, the steps of punching holes in opposite margins of the fiberboard sheet, rolling up the opposite margins of the fiberboard sheet disposing the holes in vertical alignment and securing the rolled margins to the underside of the sheet providing laminated fiberboard pallet legs along the margins of the sheet having sockets therein, reinforcing the sockets by inserting reinforcing cups therein, inserting fasteners vertically through the reinforcing cup and through the leg sockets in the sheet for securing the pallet with an article.

9. In a method of making a support base, the steps of scoring a sheet of relatively rigid form-sustaining fiber board material along score lines including a first score line spaced a first predetermined distance from one end of the sheet to define a first section, a second score line spaced a second predetermined distance from said first score line to define a second section, a third score line spaced from said second score line a distance slightly greater than said first predetermined distance to define a third section, and a fourth score line spaced from said third score line a distance slightly greater than said second predetermined distance to define a fourth section, contemporaneously cutting holes in the first and third sections as well as in a central portion of the sheet, then bending said sheet at said score lines to dispose said first section against the portion of the sheet adjacent said fourth score line with said third section parallel to said first section and with said second and fourth sections at generally right angles to said first and third sections while contemporaneously aligning the holes at each end of the sheet, securing the folded sections with the central portion of the sheet to form pads at opposite margins of the sheet, inserting cups within the aligning openings in each of the pads, and extending fasteners through the cups for securing the base to an apparatus.

10. In a method of manufacturing an article supporting structure, the steps of scoring the margins of a fiber board sheet to form a series of pad sections, folding the margins of the fiber board sheet at the score lines forming tubular cushioning pads at the underside of the sheet, providing the tubular cushioning pads with reinforcing and securing the thus folded cushioning pads with the sheet at its underside, and projecting fasteners through both the sheet and the tubular cushioning pads for securing the article supporting structure with an apparatus.

11. In a method of making a palletized support base, the steps of scoring a sheet of relatively rigid form-sustaining fiberboard material along score lines including a first score line spaced a first predetermined distance from one end of the sheet to define a first section, a second score line spaced a second predetermined distance from said first score line to define a second section, a third score line spaced from said second score line a distance slightly greater than said first predetermined distance to define a third section, and a fourth score line spaced from said third score line a distance slightly greater than said second predetermined distance to define a fourth section, then bending said sheet at said score lines to dispose said first section against the portion of the sheet adjacent said fourth score line with said third section parallel to said first section and with said second and fourth sections at generally right angles to said first and third sections, securing the thus folded margins of the sheet to the central portion of the sheet, and projecting fasteners through the sheet as well as through the folded margins for attaching the base to an article.

12. In a method of making a palletized support base, the steps of scoring a sheet of relatively rigid form-sustaining fiberboard material along score lines including a first score line spaced a first predetermined distance from one end of the sheet to define a first section, a second score line spaced a second predetermined distance from said first score line to define a second section, a third score line spaced from said second score line a distance slightly greater than said first predetermined distance to define a third section, and a fourth score line spaced from said third score line a distance slightly greater than said second predetermined distance to define a fourth section, then bending said sheet at said score lines to dispose said first section against the portion of the sheet adjacent said fourth score line with said third section parallel to said first section and with said second and fourth sections at generally right angles to said first and third sections and with terminal edges of the fourth pair of sections abutting the first pair of sections, and securing the facing surface of the fourth pair of sections to a central section of the sheet forming reinforced cushioning pads on one side of the support base thereby palletizing the support.

References Cited in the file of this patent

UNITED STATES PATENTS

| | | |
|---|---|---|
| 2,856,826 | Norquist | Oct. 21, 1958 |
| 2,888,222 | Budd | May 26, 1959 |